April 24, 1973  R. D. SUKOLICS  3,729,354
METHOD FOR MAKING INSULATED WALL SECTIONS
Filed July 31, 1970  11 Sheets-Sheet 1

Fig. 1A

INVENTOR
RONALD D. SUKOLICS
by
Mason, Kolehmainen,
Rathburn and Wyss.
ATTORNEYS April 24, 1973 — R. D. SUKOLICS — 3,729,354

METHOD FOR MAKING INSULATED WALL SECTIONS

Filed July 31, 1970 — 11 Sheets-Sheet 3

INVENTOR
RONALD D. SUKOLICS by Mason, Kolehmainen,
Rathburn and Wyss.
ATTORNEYS.

April 24, 1973  R. D. SUKOLICS  3,729,354
METHOD FOR MAKING INSULATED WALL SECTIONS
Filed July 31, 1970  11 Sheets-Sheet 8

INVENTOR
RONALD D. SUKOLICS
by Mason, Kolehmainen,
Rathburn and Wyss.
ATTORNEYS.

Fig. 19

United States Patent Office 3,729,354
Patented Apr. 24, 1973

3,729,354
METHOD FOR MAKING INSULATED WALL SECTIONS
Ronald D. Sukolics, Elkhart, Ind., assignor to American Metal Climax, Inc., New York, N.Y.
Filed July 31, 1970, Ser. No. 59,982
Int. Cl. B29c *11/00;* B29d *3/00;* B32b *31/06*
U.S. Cl. 156—244      9 Claims

ABSTRACT OF THE DISCLOSURE

An elongated heat insulating structural member of the type including a pair of spaced apart structural sections secured together by a continuous web of heat insulating material is fabricated by moving a pair of spaced apart structural sections along a predetermined path and flowing a stream of heat insulating material in a semiplastic state into a continuous void provided between the structural sections. A backing member is provided to close the bottom of the void until the heat insulating material is cured and bonded to the structural sections forming an integral heat insulating structural member.

---

The present invention relates to a method and apparatus for making an elongated architectural structural member of the type which includes a pair of spaced apart structural sections which are integrally secured together by a continuous web of heat insulating material which provides a thermal barrier for restricting the transfer of heat between the inside and outside structural sections. Not only must the heat insulating web be capable of providing the desired thermal barrier, but, in addition, should be physically strong enough to bond the structural sections into integral structural members capable of withstanding stresses encountered in the building structures, and the like.

It is an object of the present invention to provide a new and improved method of making an elongated structural member of the heat insulating type including a pair of spaced apart sections usually formed of metal and secured together by a continuous web of heat insulating material which comprises a thermal barrier between the metal sections.

It is another object of the present invention to provide a new and improved method for making an elongated structural member of the type including a pair of spaced apart structural sections secured together by a continuous web of heat insulating material which material is extruded in place in a semiplastic state into a void and maintained between the structural sections.

Still another object of the present invention is to provide a new and improved method for making an elongated structural member of the character described wherein the thermal barrier formed of heat insulating material is bonded securely to the elongated structural section.

The foregoing and other objects and advantages of the present invention are accomplished in a new method of making an elongated structural member of the character described comprising the step of aligning the structural sections in horizontal spaced apart relation to form an elongated continuous void therebetween. The bottom of the void is temporarily closed by means of a removable backing member, and the void is filled with softened heat insulating material to bond to the structural section and to form an integral heat barrier for the structural member when the heat insulating material is cured. After curing or hardening of the heat insulating material which is extruded in place in the void, the backing member is removed and the heat insulating material maintains a continuous structural web of heat insulating material between the parallel structural sections making up the elongated structural member.

Further objects and advantages of the present invention will become apparent from the following detailed description taken in conjunction with the drawings, in which.

Referring now, more particularly, to the drawings, and specifically FIGS. 1A, 1B, 2A, and 2B, therein is illustrated a new and improved apparatus for making an elongated structural member of the heat insulating type as described in detail hereinafter, which apparatus is referred to generally by the reference numeral 20. In accordance with the method of the present invention, the apparatus 20 is adapted to produce a heat insulating type of structural member 22 comprising a pair of elongated metallic structural sections 24, 26, secured together along their continuous lengths by a section of heat insulating resinous material 28 bonded thereto. The elongated metallic structural sections 24 and 26 making up the integral structural member 22, may or may not be identical and may be formed of any suitable structural materials, such as aluminum, magnesium, steel, or the like, having the required structural strength and shape for a particular architectural application. Among the commercially available structure materials suitable for such use are extruded aluminum sections. Normally, one of the structural section 24 or 26 faces on the outside of a building structure in contact with the weather, while the other structural section faces on the inside of the building wall, and the heat insulating material 28 is designed to form a heat barrier to prevent the direct conduction or transfer of heat between the inside and outside of the building. The resinous material 28 is extruded or flows in a stream while in a semiplastic state into contact with the structural sections 24 and 26 to bond therewith to form the heat barrier therebetween as well as to integrally mechanically secure the structural members together. For these reasons, the resinous material 28 should have a number of characteristics including high strength, low heat transfer, good weathering characteristics, resistance to impact, resistance to bending even at low temperatures, and good bonding capability with the metallic structural sections. One suitable material for use with structural sections formed of extruded aluminum is an ionomer resin manufactured by E. I. du Pont de Nemours & Company under the trade name of "Surlyn A." This material has been found to work well and bond well with aluminum and has characteristics well suited to moderate speed extrusion foaming at temperatures in the range of 350° to 600° F. This material is a thermoplastic material and becomes relatively solid or rigid at temperatures below 250° F. The resinous material may also include, mixed therewith, a fire retardant compound in percentages varying from 5 to 10% with an attendant increase in fire resistance and heat resistance characteristics.

In accordance with the present invention, the apparatus 20 includes a pair of tablelike support structures 30 and 32 at the input and output ends, respectively, of the apparatus. Each of the tablelike support structures includes a pair of longitudinally extending boxlike, upper frame members 34 supported from the floor or other structure on a plurality of vertical legs 36. Each leg 36 is provided with an adjustable lower foot portion 38 including an adjustment screw 40 to provide for accurate leveling of the upper longitudinal frame member 34 from a floor surface or other structure. The table-like support structures 30 and 32 also include longitudinal frame members 42 parallel with and spaced below the upper boxlike frame members 34.

In order to support various components of the apparatus 20 on the tablelike support structures 30 and 32, a plurality of heavy cross members 44 formed of relatively thick steel plates, or the like, are mounted on top of the upper longitudinal frame members 34 to extend transversely thereof.

Figure 1A:
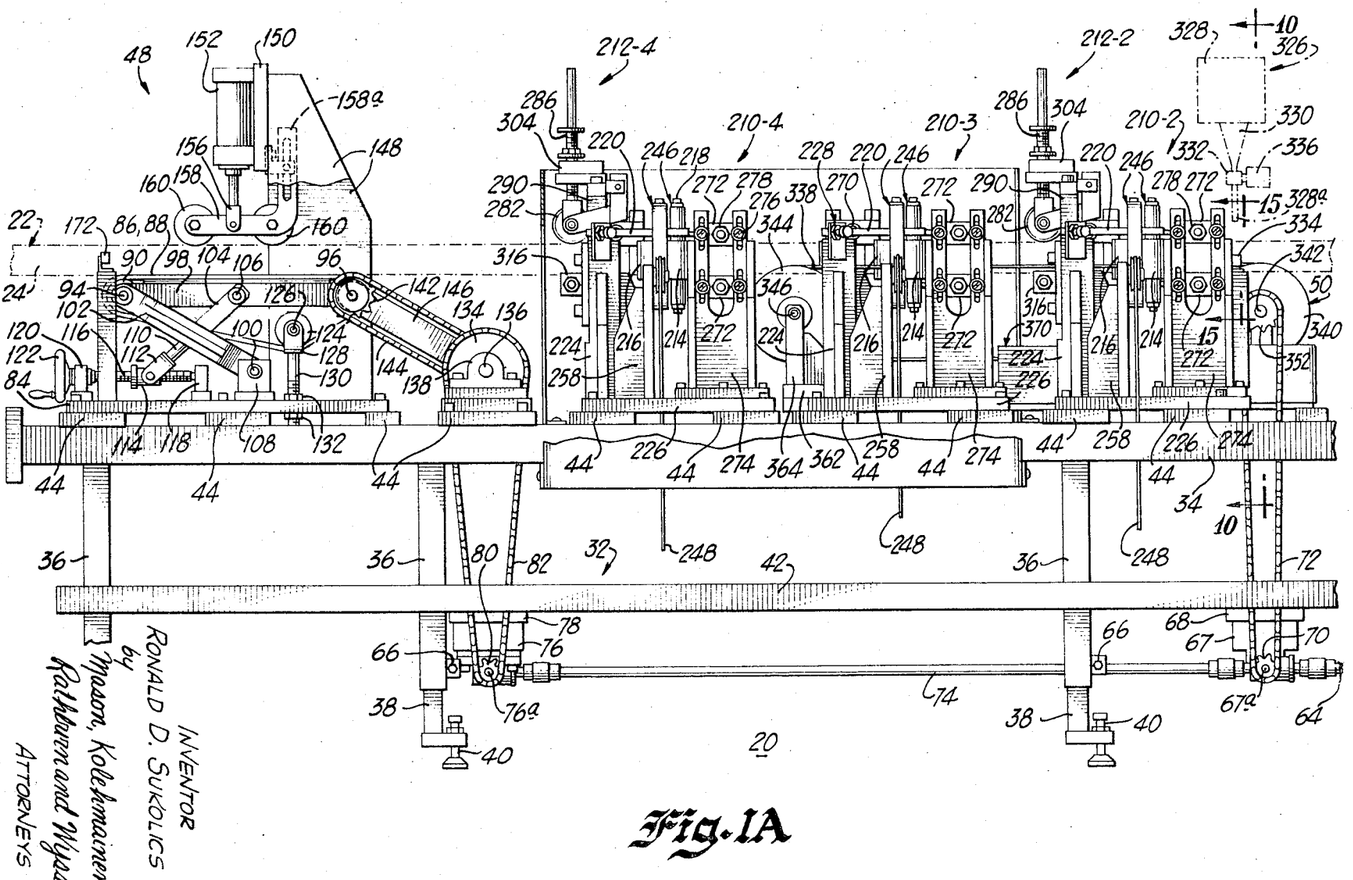
FIGS. 1A and 1B are a side elevation of a new and improved apparatus for making a heat insulated elongated structural member of the character described.
Figure 1B:
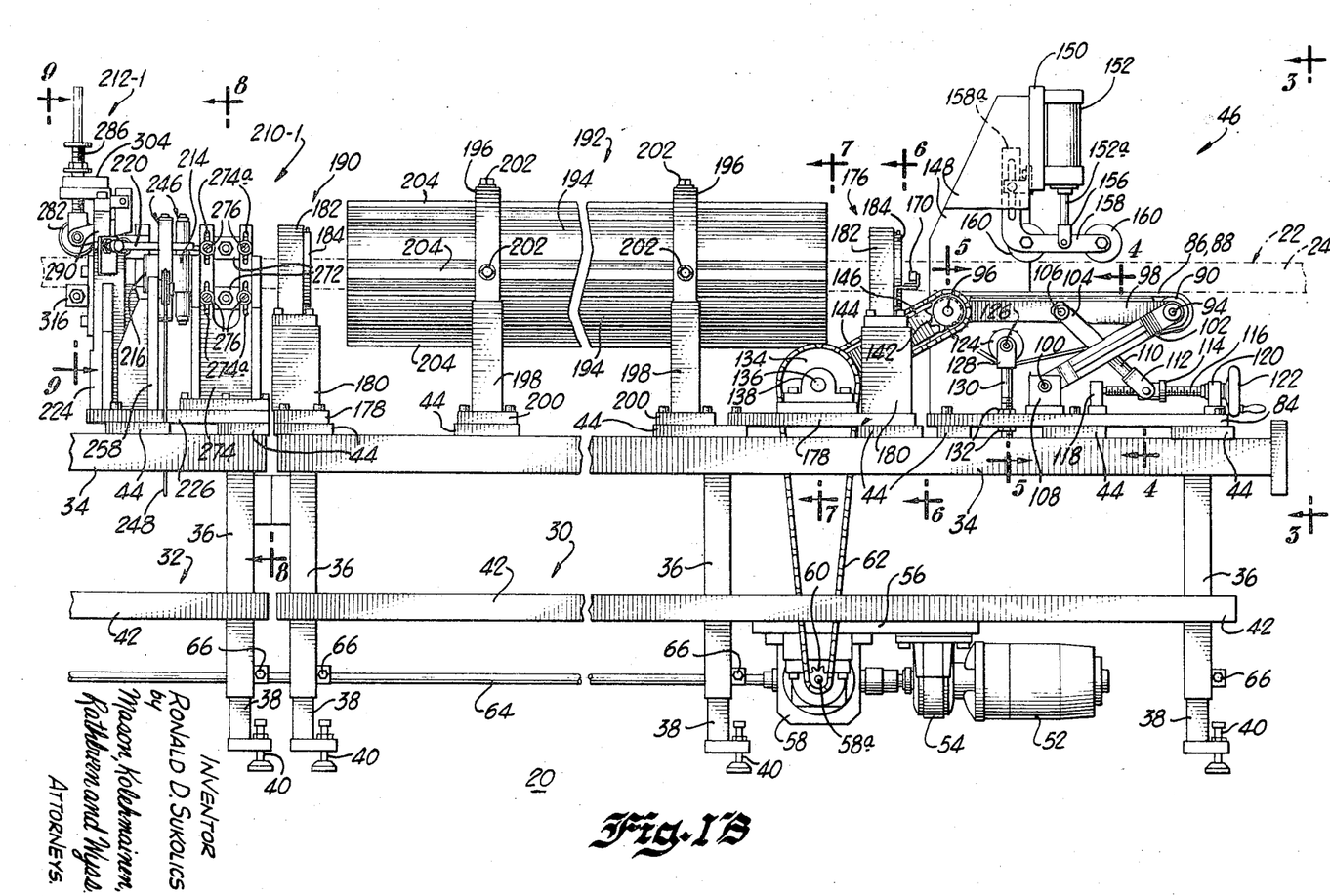

In accordance with the present invention, individual structural members 24 and 26 are pulled into the apparatus from right to left by an input feeder mechanism generally indicated as 46 and positioned at the right-hand end of the input support table structure 30, as viewed in FIG. 1B. As the aligned structural members 24 and 26 move from the right to left through the apparatus 20, the insulating material is applied into the void between the two structural sections and the finished structural member 22 is pulled through the apparatus from the right to left by an output puller feed assembly generally indicated as 48, which is similar to the input feeder assembly 46. The output feed assembly 48 is located at the left-hand end of the output structure 32, as viewed in FIGS. 1A and 2A and acts to pull the finished product through the apparatus, whereas the input feed assembly 46 pushes the individual structural sections 24 and 26 into the process. The input and output feed mechanisms 46 and 48 plus a backing assembly, generally indicated by the numeral 50 (FIG. 11), are driven in synchronism by a single source of motive power comprising an electric drive motor 52, drivingly connected with a clutch assembly 54 mounted on the underside of a baseplate 56 which is secured to the lower longitudinal frame members 42, as shown in FIG. 1B. The clutch assembly 54 is connected to a reduction gear unit also mounted on the baseplate 56 and provided with a transverse output shaft 58a, which is drivingly connected with the input feeder assembly 46 through a sprocket 60 and chain 62. The transverse output shaft 58a of the gear reducer 58 is driven at the same speed as the main output shaft thereof which is coupled to a longitudinal drive shaft 64 supported on a plurality of transverse bearing assemblies 66 attached to support legs 36 of the tablelike support structures 30 and 32. The drive shaft 64 is coupled to an angle drive unit 67 mounted on a baseplate 68 secured to the lower frame members 42 of the output tablelike support structures 32. The angle drive unit 67 includes a transverse output shaft 67a which is drivingly connected with the backing mechanism 50 through a sprocket 70 and chain 72. The angle drive unit 67 includes a longitudinal shaft connected to the drive shaft 64 at one end, and connected to a second longitudinal drive shaft 74 which is coupled at its outer end to a second angle drive unit 76 mounted on baseplate 78 supported on the longitudinal frame members 42. The angle drive unit 76 includes a transverse output shaft 76a which is drivingly connected to the output feed assembly 48 through a sprocket 80 and chain 82. The single drive motor 52 is thus able to synchronizingly drive the feed mechanisms 46 and 48 and the backing mechanism 50 at a constant speed for moving the structural sections through the apparatus 20. The input and output fed mechanisms 46 and 48, respectively, are substantially identical and, accordingly, like reference numerals will be used in describing the components thereof. The feed mechanism 46 includes a main baseplate 84 supported on a plurality of cross members 44 and a pair of endless drive belts 86 and 88 are provided for direct driving engagement with the respective longitudinal structural sections 24 and 26 used for making up the integral structural member 22. Each drive belt 86 and 88 is trained around an idler pulley 90 at one end and a drive pulley 92 at the opposite end, which pulleys are supported on axles 94 and 96 journaled for free rotation at opposite ends of a channel-like support framework 98. As best shown in FIGS. 1a and 1b, the channel support frames 98 are parallel to the frame members 34 and the spacing therebetween is adjustable to accommodate different steps of structural sections 24 and 26 used for making up the integral structural member 22, in accordance with the invention.

Figures 3, 4:
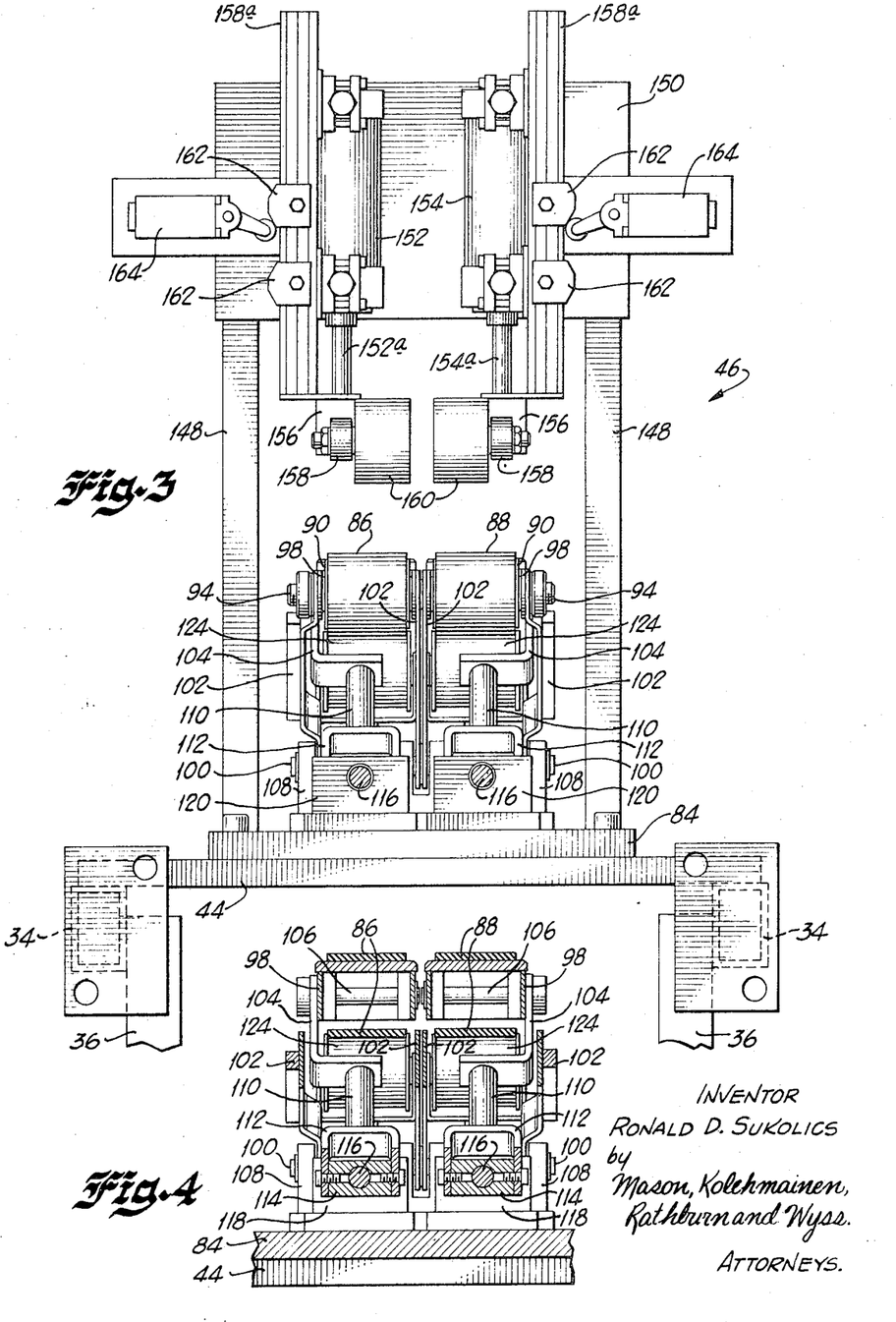
FIG. 3 is a vertical transverse elevational view of the input end of the apparatus of FIGS. 1A and 1B.
FIG. 4 is a fragmentary transverse sectional view taken along line 4—4 of FIG. 1B.

For the purpose of adjustably supporting the framework 98 of the feed conveyors and, accordingly, adjusting the level of the upper run of the feed belts 86 and 88, respectively, the idler shafts 94 are structurally interconnected to a pivot shaft 100 through the port linkage members 102 having varying surfaces adjacent opposite ends thereof for the respective shafts or pivot axles 94 and 100. Adjustment of the elevation of the feed belt is provided by means of pairs of adjustment linkage members 104 having upper ends pivotally connected to the channel-shaped framework 98 of the feed conveyors by pivot pins 106. The pivot axles 100 are supported by bearing blocks 108 mounted on the baseplate 84 and, as best shown in FIGS. 3 and 4, the lower end of the adjustment wings 104 comprise rods 110 having clevises 112 attached thereto. The depending legs of the clevises 112 are attached to adjustment blocks 114 having threaded bores for receiving threaded adjustment axles 116. Each adjustment axle is supported at opposite ends by a bearing block 118 and 120. The threaded adjustment shaft 116 projects outwardly through the bearing blocks 120 and are restrained from longitudinal movement thereby. A hand wheel 122 is provided on the outer ends of the adjustment shafts 116 in order to conveniently make adjustments as necessary to raise or lower the upper run of the structural feed belts 86 and 88.

Figure 5:
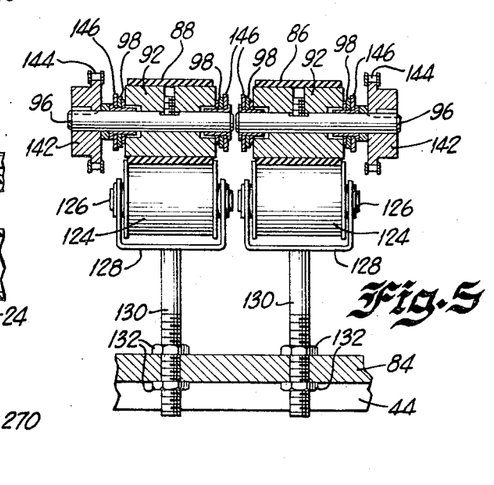
FIG. 5 is a transverse sectional view looking in a direction opposite to FIG. 4 and taken substantially along line 5—5 of FIG. 1B.

It will thus be seen that by turning the hand wheel 122, the level of the upper run of the feed belts 86 and 88 may be adjusted independently and are always maintained in parallel with the horizontal or the upper frame member 34 of the support table structure. Dual feed belts 86 and 88 are provided so that structural sections 24 and 26 of different dimensions may be utilized. Of course, if only identical sections are to be used, a single feed belt could be provided instead of a pair of independently adjustable feed belts as illustrated. The return run of the feed belts 86 and 88, respectively, are supported by idler rollers 124 mounted on axles 126 supported by clevises 128 carried at the upper end of adjustment support rods 130, as best shown in FIG. 5. The lower end portions of the rods 130 project through openings formed in the mounting base and are threaded in order that locknut 132 may be utilized to adjust the height of the support rods 130 on the mounting base. Driving power for the endless drive belts 86 and 88 is supplied from the chain 62 which drives a sprocket 134 mounted on an intermediate shaft 136 supported at opposite ends by the bearing blocks 138. The shaft 136 carries a pair of sprockets 140 which are drivingly connected to sprockets 142 on the axles 96 by a drive chain 144. Because the plane of the respective drive belts 86 and 88 is adjustable vertically, it is desirable to maintain a constant distance between the intermediate drive shaft 136 and the respective axles 96 supporting the drive pulleys 92 for the respective drive belts. Accordingly, the shaft 136 is interconnected with the drive axles 96 by means of hollow linkage members 146 (FIGS. 6 and 7) having suitable bearings at adjacent opposite ends for accommodating the axle 136 and shaft 96.

In order to establish and maintain engagement between the structural sections 24 and 26 and the respective feed belts 86 and 88, the feed mechanisms 46 and 48 include a pair of upstanding support brackets 148 of relatively heavy construction disposed on opposite sides of the feed belt and secured at their lower ends to the baseplate 84. The cross plate 150 interconnects the upper ends of the upstanding side brackets 148 and provides a mounting base for a pair of pneumatic cylinders 152 and 154 which are mounted thereon. The cylinders 152 and 154 are supplied with compressed air and each includes a piston rod 152a and 154a, having clevises 156 (FIGS. 1A and 1B) attached to the lower ends of the rods. Each clevis 156 is pivotally secured to an L-shaped roller support bracket having a pair of pressure rollers 160 mounted thereon for downward pressure contact with the upper surface of the structural sections 24 and 26 being joined in the apparatus 20. As best shown in FIG. 3, the pressure rollers 160 are controlled by the respective cylinders 152 and 154 above the feed belts 86 and 88, respectively, so that in each case the respective structural sections 24, 26 is forced downwardly against the feed belt by the pressure roller. As shown best in FIGS. 1A and 1B, the L-shaped support brackets 158 for the rollers include an upstanding leg 158a on which are mounted a pair of switch actuators 162, for actuating limit switches 164 secured to the cross plate 150.

Figure 18:
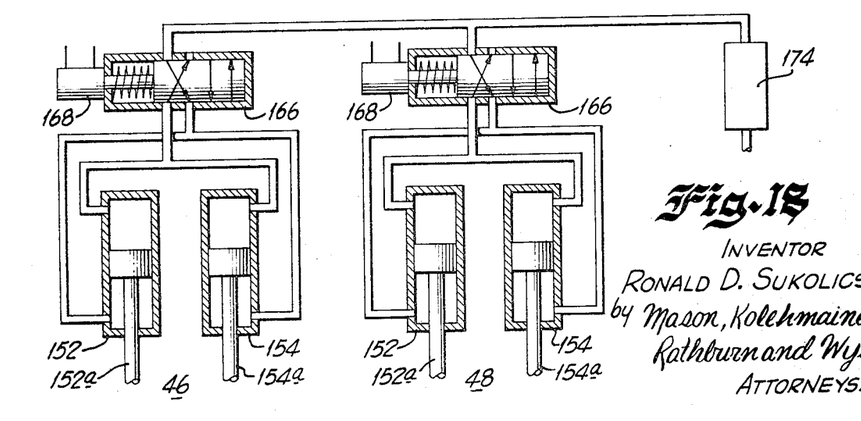
FIG. 18 is a schematic diagram illustrating a pneumatic system for the apparatus of the present invention.
Figure 19:
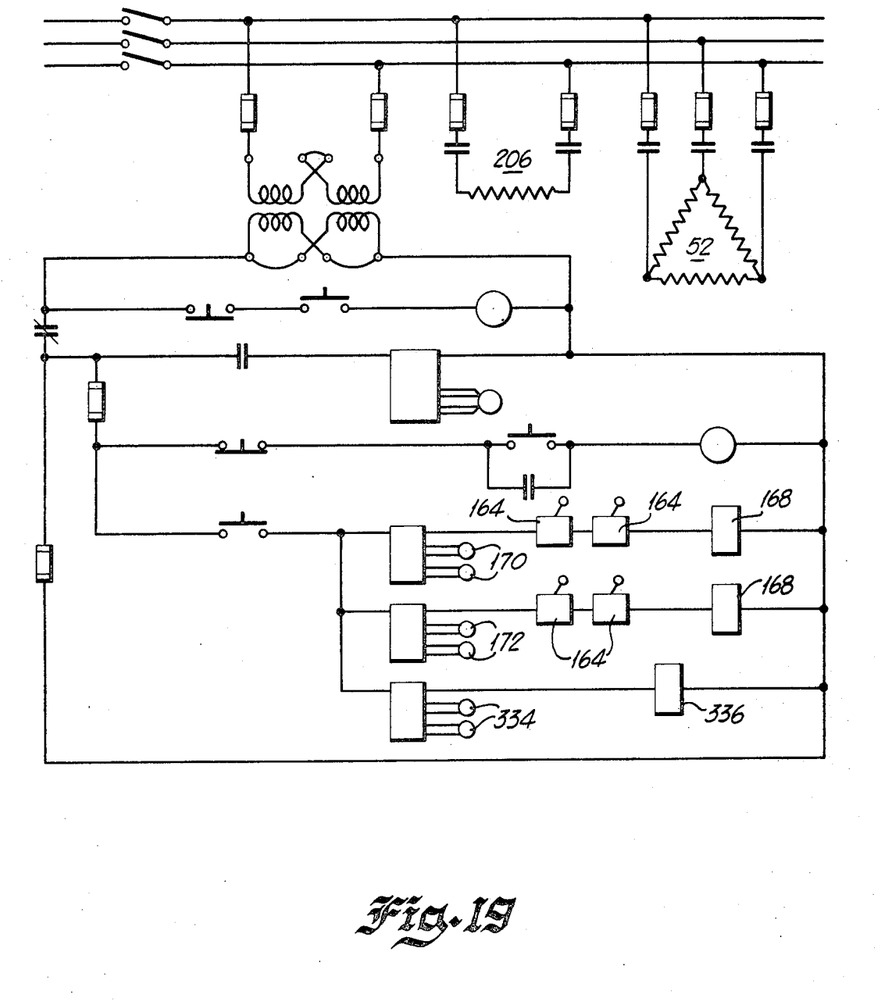
FIG. 19 is a schematic electrical diagram of the electrical circuits of the apparatus of the present invention.

Control of pressurized fluid for raising or lowering the pressure rollers 160 through the actuattion of cylinders 162 and 164 in the input and output feeders 46 and 48 is provided through pairs of solenoid actuated reversing valves 166, as shown in FIG. 18. The valves 166 include solenoid coils 168; and electric eye mechanisms 170 and 172 (FIGS. 1A and 1B), are utilized for controlling the current flow to the respective reversing valves 166.

Figure 6:
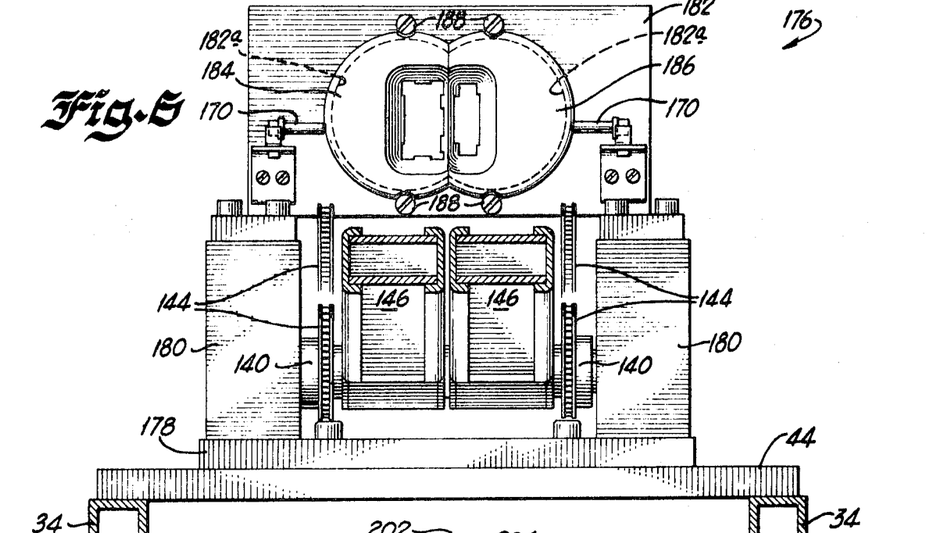
FIG. 6 is a transverse sectional view taken substantially along line 6—6 of FIG. 1B showing the rough alignment section of the apparatus.
Figure 7:
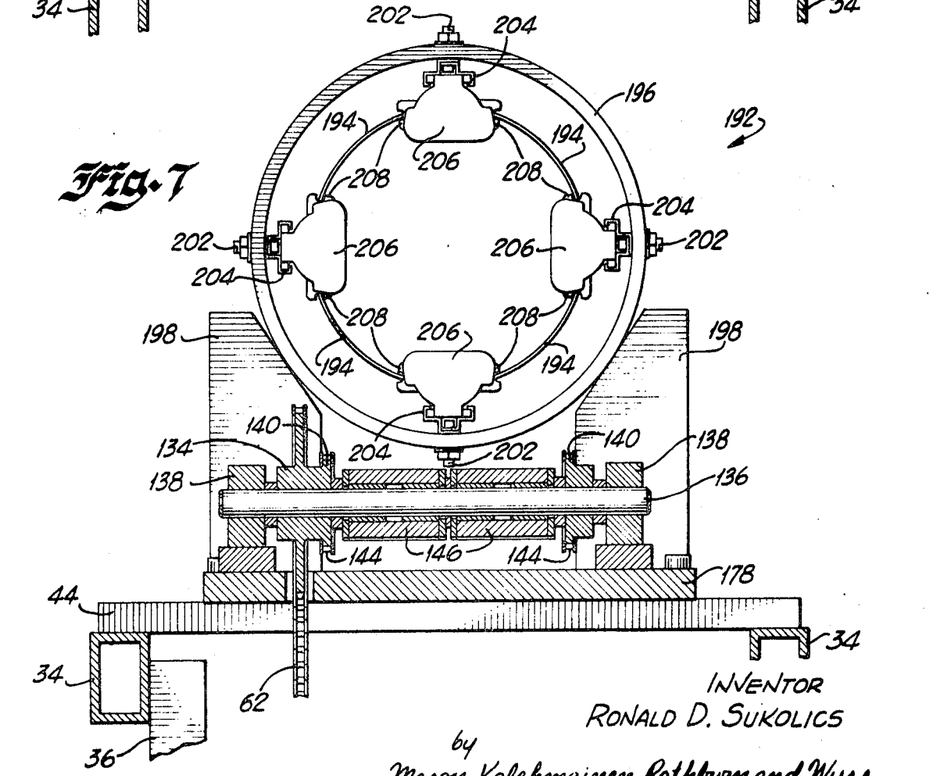
FIG. 7 is a transverse sectional view taken along line 7—7 of FIG. 1B looking into the entrance end of the heater.

Referring to FIG. 6 and FIG. 1B, the electric eye 170 senses whether a structural section 22 has been advanced far enough to begin processing by the input feeder assembly 46, and when the light beam between the two portions of the electric eye system (FIG. 6) is interrupted, an electrical signal is sent to the solenoid coil 168 of the reversing valve 166 which controls input feeder 46. When this occurs, the valve 166 is operated from one position to the opposite position so that pressurized fluid from a fluid source 174 will be directed into the upper end of the cylinders 152 and 154, respectively, causing the pressure rollers 160 to be moved downwardly against the upper surface of the structural sections 24 and 26 forcing the sections in driving contact against the respective belts 86 and 88 of the input feeder and actuating the belts. The air pressure in the pneumatic system delivered from the source 174 is selected to provide a desired clamping or holding force which assures that slippage does not occur between the structural sections as they are fed by the belts of the feeder.

The electric eye system 172 associated with the output or pulling feed assembly 48 is located adjacent the exit end of the apparatus 20 so that as the tail end or last portion of the completed structural member 22 leaves the apparatus the reversing valve 166 associated with the fluid cylinders 152 and 154 of the output feed 48 are actuated to lift the pressure rollers 160 upwardly ready to receive the next structural member to be produced.

In accordance with the present invention, an initial rough alignment of the elongated structural sections 24 and 26 into parallel for movement along a horizontal work path is accomplished in a first rough alignment station generally indicated by the reference numeral 176 and shown best in FIG. 6. The initial rough alignment station 176 includes a baseplate 178 and a pair of upstanding support legs 180 on either side of the drive chains 144 for the respective feed belts 86 and 88 of the input feeder 46. Support legs 180 provide support at opposite ends for a cross member 182 having a circular opening 182a formed therein of large enough size to accommodate the largest cross-sectional shape of structural member to be used in the system. As best shown in FIG. 6, the cross member 182 provides support for a pair of die members 184 and 186, respectively, which are removably mounted thereon by means of cap screws 188. Respective dies 184 and 186 are provided with appropriate guide apertures therein similarly shaped to roughly accommodate the cross-sectional shape of the respective elongated structural sectional sections 24 and 26 used for making up the composite structural members 22. Accordingly, when it is desired to change to structural sections of different shapes it is simply necessary to remove the respective dies 184 and 186 by loosening of the mounting screws 188 and replace the dies with similar dies appropriate to the cross-sectional shapes to be used. In addition to the rough alignment station 176, as just described, a secondary rough alignment station 190 is provided at the exit end of the input table support structure 30. The final rough alignment station 190 is substantially identical to the first described initial rough alignment station 176 except that closer tolerances may be provided for the apertures formed in the alignment dies 184 and 186 thereof to provide more precise guiding alignment of the structural sections 24 and 26 as they are moved along the work path in the process.

In accordance with the present invention, a feeder or oven generally referred to by the reference numeral 192 is provided intermediate the initial and final rough alignment stations on the input table support structure 30. As the structural sections 24 and 26 are passed through the oven 192, the temperature thereof is elevated to a range of from 300 to 350° F. to perfect a better bonding action with the Surlyn plastic heat insulating material 28 which will be applied to bond the structural sections together. The oven 192 includes a (FIG. 7) cylindrical outer shell 194 in coaxial alignment with the work path traveled by the structural member, and the shell is open at opposite ends as shown to permit the entry and exit of the structural members. The shell is supported in a plurality of annular support rings 196 which are in turn supported by upstanding legs 198 carried on bases 200 supported by cross members 44. Precise centered alignment of the cylindrical oven shell 194, which includes a heat reflective inner surface, is provided by means of a plurality of centering bolt and nut assemblies 202 projecting through the support ring 196 and anchored at their inner ends with socket channels 204 (FIG. 7) running longitudinally of the shell. The socket channels 204 are provided for supporting sockets for individual heaters, such as heat rods 206, which are arranged along the socket channels adjustable to achieve the temperature required for various masses of the structural members 24 and 26 upon exit from the far end of the oven shell. Each of the heat rods 206 is supported in the oven shell 194 in a grommet member 208 formed of heat insulated material, and longitudinal spacing between the socket or heat lamps in each row is adjusted initially to provide for the desired temperature elevation of the structural members 24 and 26 based on the longitudinal travel speed through the over shell 194 in a given application. As previously indicated, when the structural members exit the end of the shell and move into the final rough alignment station 190, the temperature of the structural section has been elevated to the range of 300 to 350° F. in order to provide a more effective bonding surface with the heat insulating material which is to be applied between the parallel aligned structural sections.

In order to precisely hold and guide the aligned structural members 24 and 26 in parallel alignment while the heat insulating material 28 is applied in the channels or openings therebetween and secured to form the integral structural member 22, the structural sections are passed through a plurality of spaced, successive, close, horizontal alignment stations 210–1, 210–2, 210–3, 210–4. Precise vertical alignment between the moving structural sections 24 and 26 is provided by a series of successive, close, vertical alignment stations 212–1, 212–2, 212–3 (not shown) and 212–4, following the respective ones of similarly numbered horizontal alignment stations. The close, horizontal and vertical alignment stations maintain parallel alignment between the moving structural sections 24 and 26 during the critical time that the heat insulating material is introduced and cured into a rigid body for holding the structural sections together to form the integral structural member 22. Because the successive horizontal alignment stations are substantially identical with one another, they will be referred to generally as the alignment station 210 and only one will be described in detail. Similarly, the close, vertical, alignment stations 212 are identical and only one will be described in detail herein.

Figure 2A:
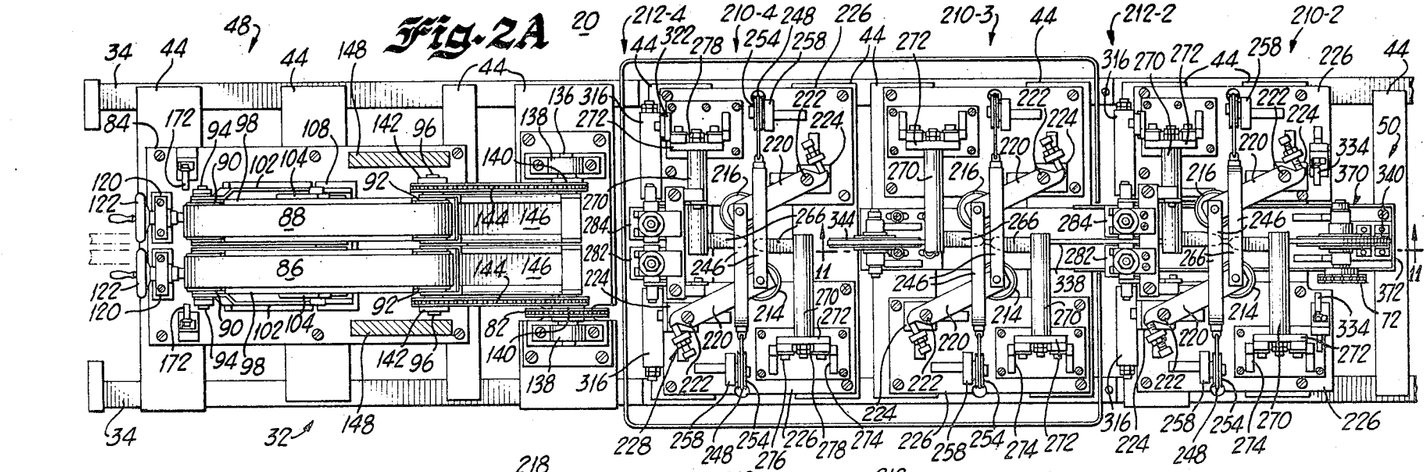
FIGS. 2A and 2B are a top plan view of the apparatus of FIGS. 1A and 1B.
Figure 2B:
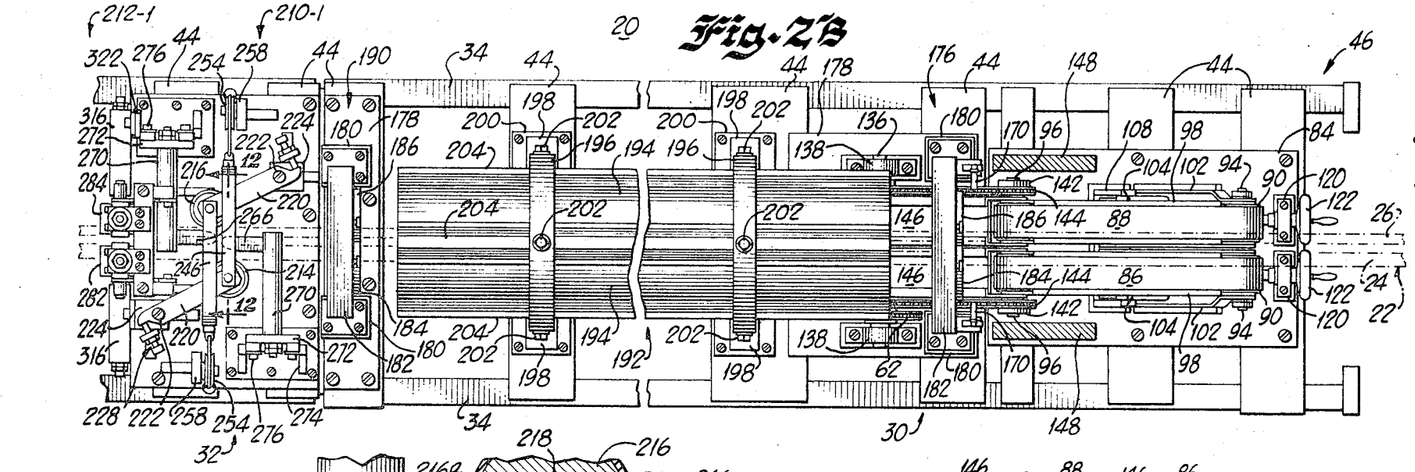
Figure 8:
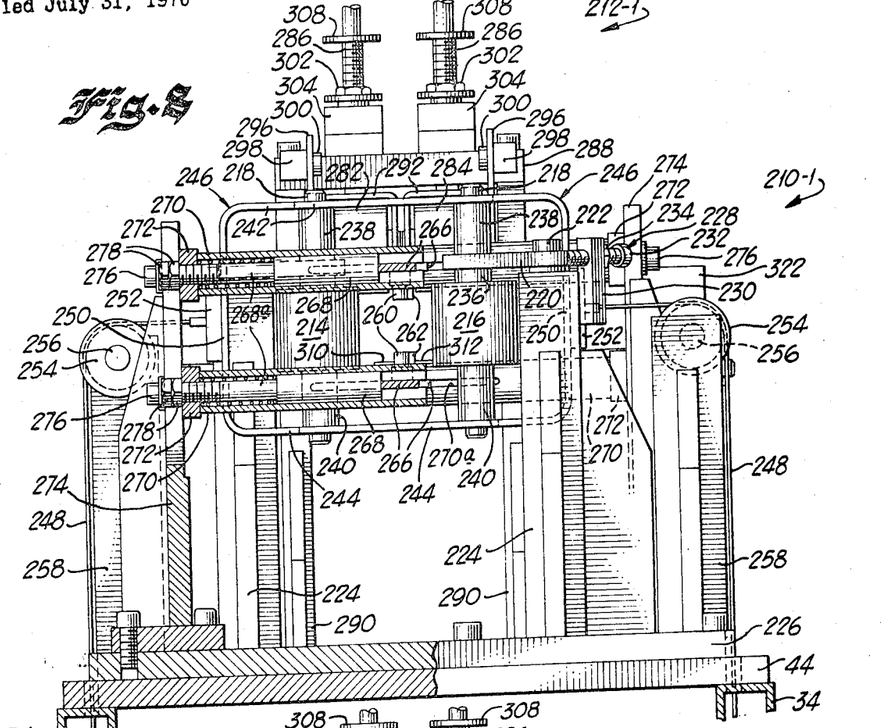
FIG. 8 is a transverse sectional view taken along line 8—8 of FIG. 1B illustrating the first step of first horizontal alignment means.
Figure 10:
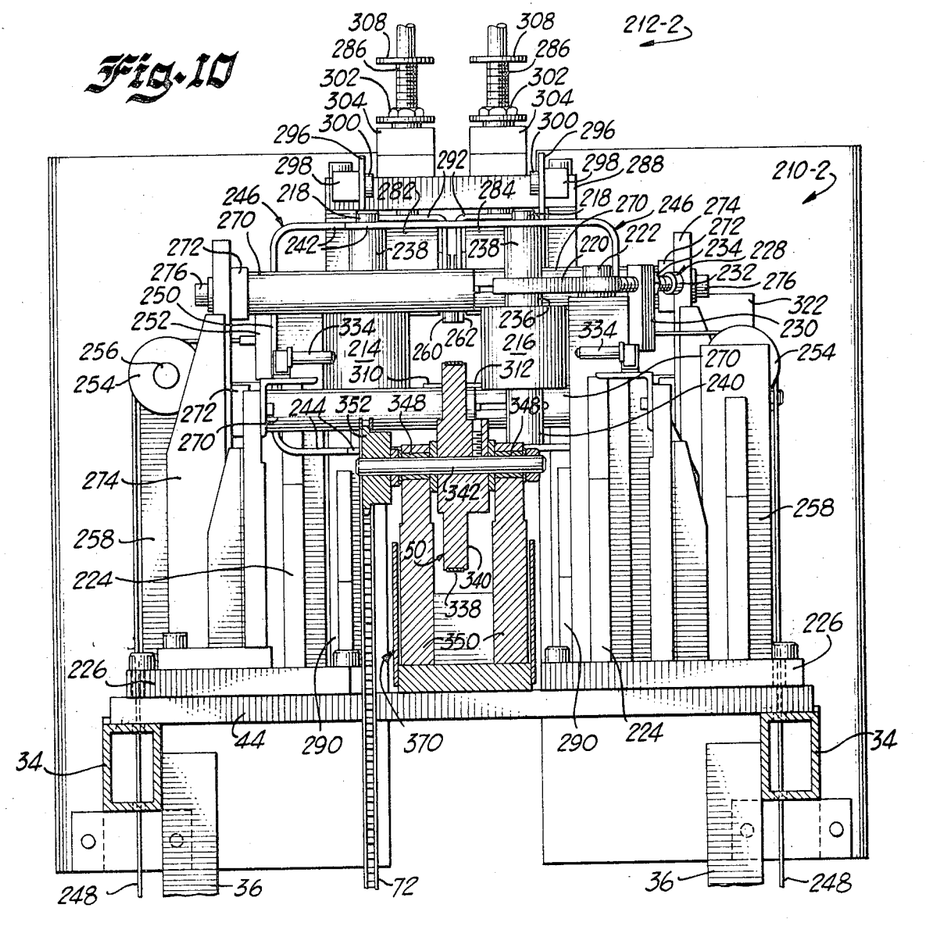
FIG. 10 is a vertical sectional view taken substantially along line 10—10 of FIG. 1A showing the apparatus of the pouring station.
Figure 11:
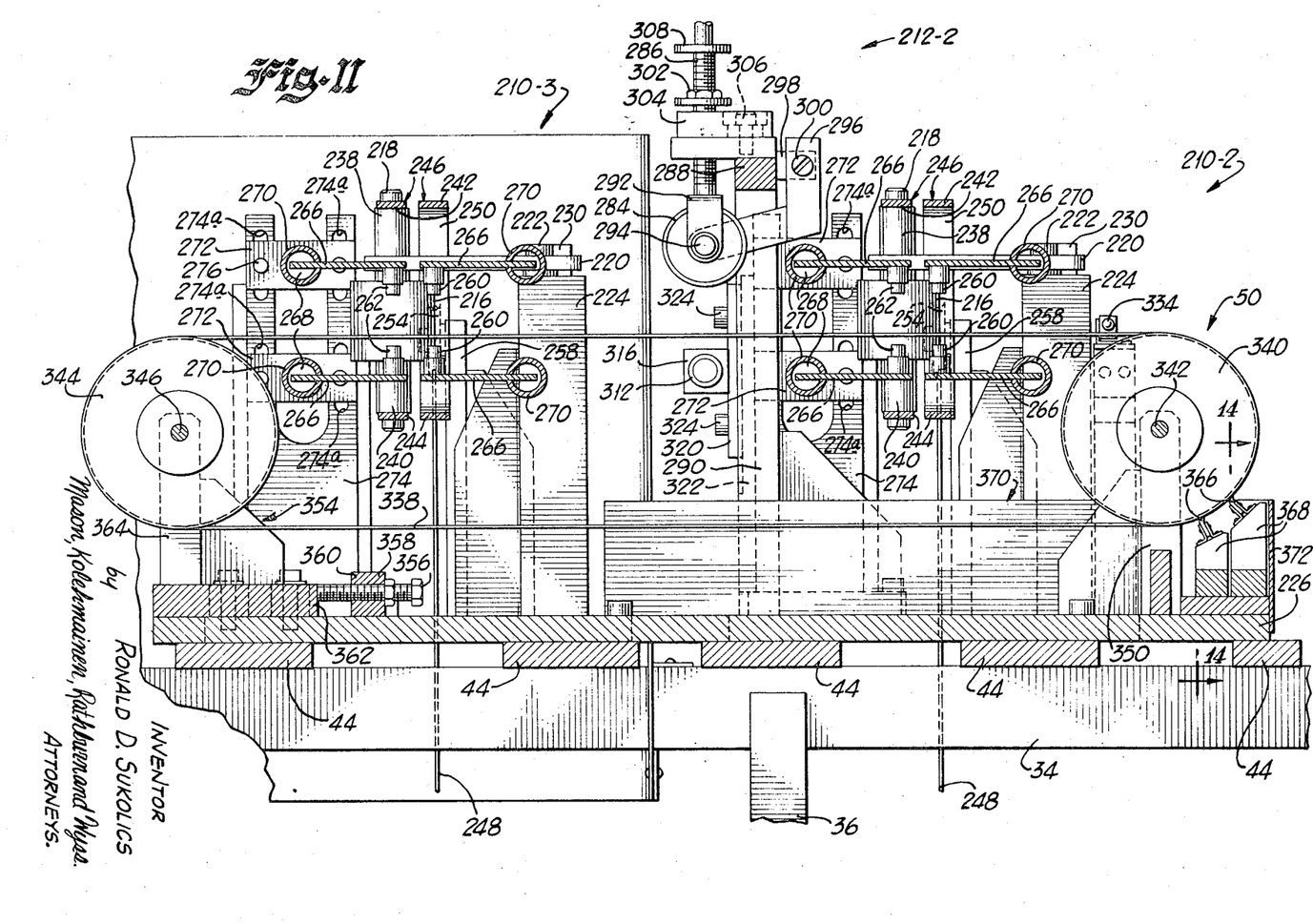
FIG. 11 is a longitudinal sectional view taken substantially along the line 11—11 of FIG. 2A illustrating backing support means for the heat insulating material in the void between the structural sections.
Figure 12:
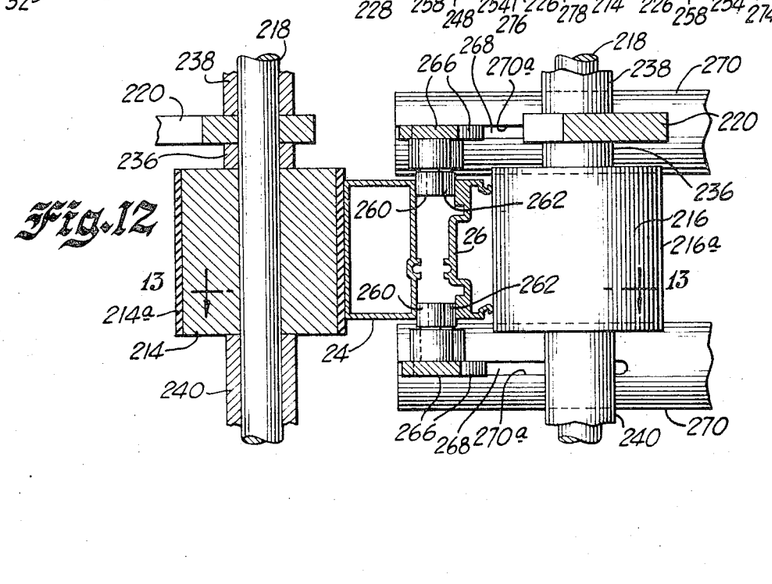
FIG. 12 is an enlarged fragmentary sectional view taken substantially along line 12—12 of FIG. 2B illustrating in detail the fine horizontal close alignment means.
Figure 14:
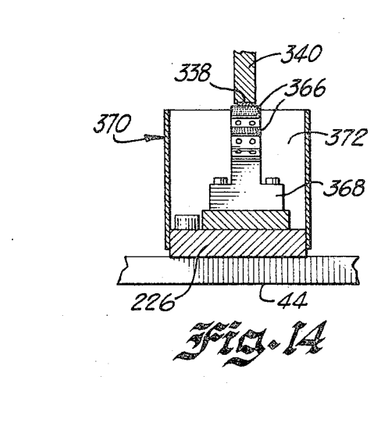
FIG. 14 is a fragmentary sectional view taken substantially along line 14—14 of FIG. 11.

In accordance with the present invention, each close, horizontal, alignment station 210 includes a pair of outside biasing rollers 214 and 216, respectively, for biasing inwardly the respective structural sections 24 and 26 in precise, parallel alignment. The outside biasing rollers 214 and 216 are provided with outer jackets 214a and 216a, respectively, formed of resilient material designed to prevent damaging of the outside surfaces of the structural sections 24 and 26 (FIGS. 12 and 14). The outside pressure rolls 214 and 216 are supported on vertical shafts 218 which are mounted on arms 220 pivotal in a horizontal plane to move the rolls inwardly and outwardly with respect to the structural sections being processed. As best shown in FIGS. 2A and 2B, the outside roll support arms 220 are supported for pivotal movement about a vertical axis on pivot pins 222 which are threaded into suitable bores provided in the upper end portions of upstanding support poles 224, best shown in FIG. 11. Pairs of post 224 are disposed on opposite sides of the center line of the path of movement of the structural sections 24 and 26. Each pole supports the arms 220 and is associated outside biasing roller 214 or 216. The poles 224 in turn are supported on an angular baseplate 226 carried on the cross members 44, as best shown in FIG. 11. In order to limit the inward travel of the outside backing rollers 214 and 216, respectively, adjustable stop mechanisms 228, best shown in FIGS. 2A and 2B and 8 and 10, are provided for contact with surfaces on the inner ends of the support arms 220, as best shown in FIG. 2A. Each stop mechanism 228 includes an upstanding support bracket 230 having a threaded bore therein and secured to the support poles 224. The threaded stop bolt 232 is provided to extend through the threaded bore of the support bracket 230 and an inner end of the stop bolt is designed to engage and limit the movement of the stop surface on the support arms 220, as indicated in FIGS. 2A and 2B. Locknuts 234 are provided to maintain the adjusted position of the stop bolts 232. As best shown in FIG. 12, a bushing or collar 236 is provided between the upper end of the biasing rolls 214 and 216, respectively, and the support arms 220. An upper spacing sleeve 238 is provided on the axle 218 above the arms 220 while the lower spacing sleeve 240 is provided on the axles 218 below the outside biasing rolls in order to position the rolls vertically on the supporting shaft between the upper and lower horizontal arms 242 and 244 of U-shaped biasing puller brackets 246, best shown in FIGS. 8 and 10. The respective outside biasing rollers 214 and 216 are biased inwardly toward the center line of the path of travel of the structural sections by outward pulling force on the U-shaped brackets 246. The outward pulling bias on the brackets is developed through cables 248 connected to the bight portions 250 of the U-brackets by means of connector fittings 252, best shown in FIG. 8. The cables 248 are trained over rollers or sheaths 254 on axles 256 provided at the uper ends of vertical support posts 258, as shown in FIGS. 8 and 10. Support posts are secured in place on the baseplate 226 and the cables extend vertically downwardly from the sheaths 254 to suitable openings provided in the support bases and cross members 44. Brakes or tension means, such as weights, not shown, are attached to the lower ends of the cables 248 to effect the desired biasing force on the outside biasing rolls 214 and 216 to urge these rolls inwardly against the outer surface of the respective longitudinal structural sections 24 and 26, respectively.

Figure 13:
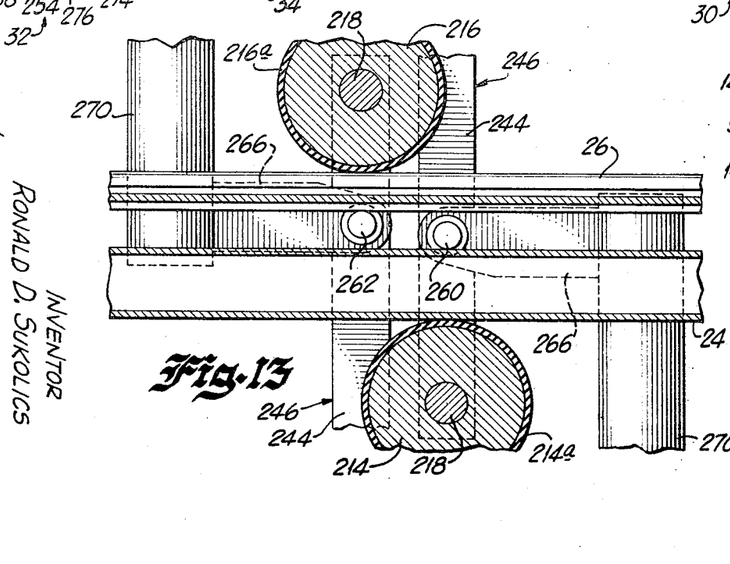
FIG. 13 is a fragmentary horizontal sectional view taken substantially along line 13—13 of FIG. 12.

In order to develop and maintain precise, horizontal spacing between the inside facing adjacent surfaces of the respective longitudinal structural sections 24 and 26, each horizontal alignment station 210 includes two pairs of upper and lower inside guide rolls 260 and 262, respectively, which bear against inside facing surfaces of the longitudinal structural sections 24 and 26, as best shown in FIG. 13. The upper and lower guide rolls 260 which bear against the sections 24 are supported on vertical axles 264 mounted at the outer end of support arms 266 spaced above and below the center line of the moving structural members 22. The support arms 266 extend generally parallel with the center line of the path of movement of the structural member 22 and are mounted at the outer ends of transverse adjustable rod members 268, best shown in FIG. 8. The rod members 268 are supported for transverse sliding movement within tubular sleeves 270 provided with an elongated longitudinal slot 270a adjacent the outer ends, such as shown in FIG. 8. Each sleeve is provided with a rectangular mounting base 272 which is adjustably supported on an upstanding support post 274 and is held in place thereon by cap screws 276 which project into vertical slots 274a provided in upstanding leg poritons of the support post 274, as best shown in FIGS. 1A and 1B. The sleeve faces 272 can be moved up and down on the support posts 274 to accommodate structural sections 24 having different depths and the rods 268, which support the arms 266, can be adjusted transversely with respect to the path of movement of the structural members 22. For this purpose, each rod member 268 is provided with a threaded shank portion 268a, which projects through an opening sleeve base 272 and is secured by means of a pair of locknuts 278. A coil spring is provided to bias the rod 268 toward the center line of the structural member and tightening of the locknut 278 draws the rod in the opposite direction compressing the bias spring. It will thus be seen that the positions of the inner guide roll 260 and 262 are adjustable in both a vertical and a horizontal direction to accommodate variations in the cross section of structural sections 24 and 26. The inside rolls 260 and 262 precisely determine and guide movement of the structural sections so that a desired spacing interval between the sections is achieved for filling with the heat insulating material. The outside pressure rolls 214 and 216 urge the structural sections inwardly into contact with the inside guide rolls 260 and 262 as thus seen in FIG. 13. Each of the horizontal alignment stations 210–1, 210–2, 210–3, and 210–4 provides for accurate and precise guidance of the moving structural sections 24 and 26 in the critical phase of the process wherein the heat insulating material 28 is flowed into the channel or spacing between the structural sections.

Figure 9:
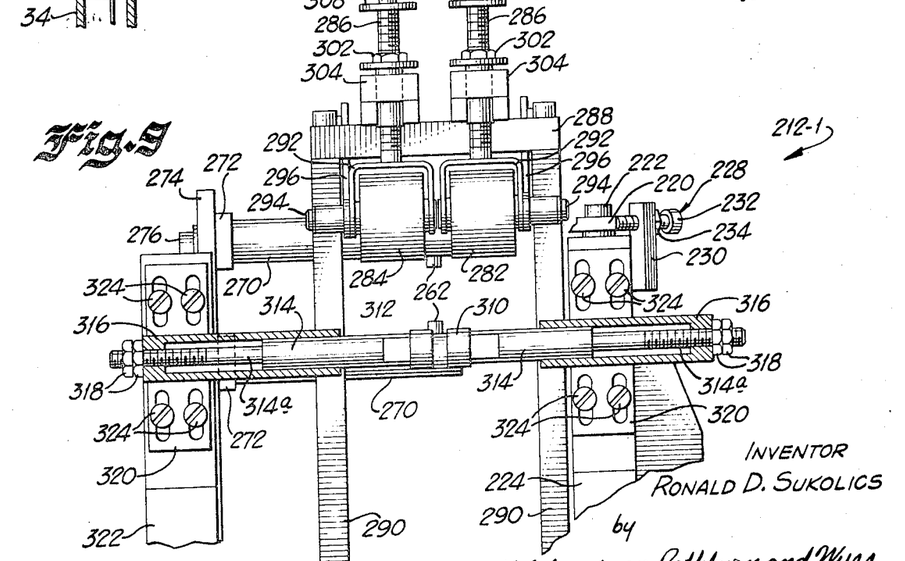
FIG. 9 is a transverse sectional view taken substantially along line 9—9 of FIG. 1B illustrating the first set of fine vertical alignment means.

Referring more particularly to FIGS. 9 and 11, each of the close vertical alignment stations 212 includes a pair of upper rolls 282 and 284, respectively, for holding down the structural sections 24 and 26 as they pass along the apparatus 20. The vertical position of the rolls 282 and 284, respectively, are independently controlled by means of adjusting screws 286 which extend slidably upwardly through threaded apertures provided in a supporting cross member 288. The cross members are supported by a pair of upstanding support posts 290 spaced on opposite sides of the paths traveled by the structural section 22 during assembling. Each upper pressure roller 282 or 284 is supported in a U-shaped fork 292 having downwardly depending legs for supporting a roller axle 294. The upper end of the axle 294 is journaled in the outer, generally horizontal end leg of an L-shaped lever member 296 pivotally attached to the upstanding support posts on a bracket 298 by means of a pivot screw 300 (FIG. 11). The lower limit of the adjusting rods 286 is controlled by locknut assemblies 302 to conform with the cross section of the structural shapes passing through the machine. Adjustment of the force on the rods 286 is accomplished by placement of weights (not shown) on the pad 308. The forward surfaces of the respective elongated structural sections 24 and 26 are supported by lower support rolls 310 and 312, respectively (FIG. 9), which are journaled for free rotation on the outer ends of adjustable axle members 314. The axles 314 are movable into adjustable positions inwardly and outwardly of the center line of the path of structural members and are mounted in sleeves 316 having outer end walls with threaded apertures therein for receiving threaded stem portions 314a of the roller support axle. The position of the lower support rolls 310 and 312 relative to the center line of the path of travel of the structural member 22 is established by tightening or loosening adjustable locknuts 318 which bear inwardly against the outer ends of the sleeves 316. The sleeves are supported on vertically extending slotted brackets 320 which are attached to the outer support post members 322 by means of cap screws 324. The vertical and horizontal positions of the lower support rolls 310 and 312, respectively, are thus adjustable to accommodate the type of structural shapes 24 and 26 being handled in the process, and likewise the upper pressure rollers 282 and 284 are adjustable to insure that the structural sections are maintained to move in a precise path.

Figure 15:
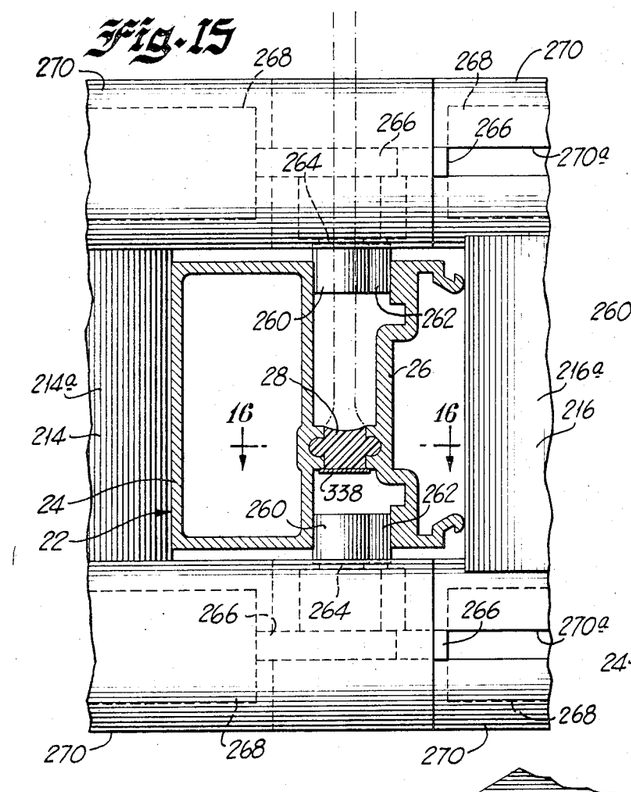
FIG. 15 is an enlarged transverse sectional view taken substantially along line 15—15 of FIG. 1A.
Figure 16:
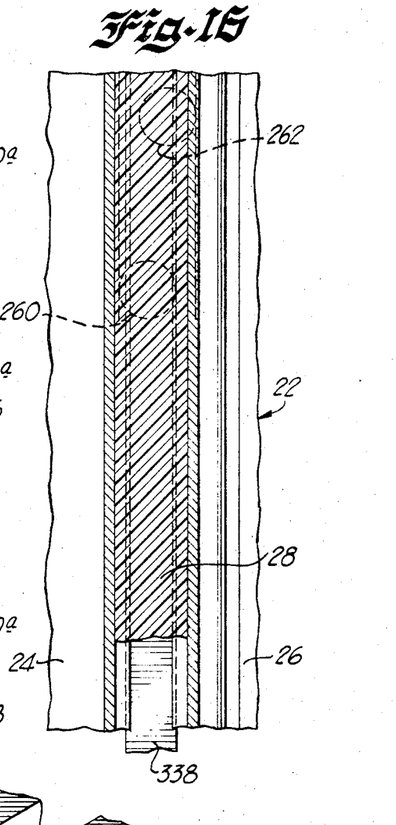
FIG. 16 is a fragmentary horizontal sectional view taken substantially along line 16—16 of FIG. 15.
Figure 17:
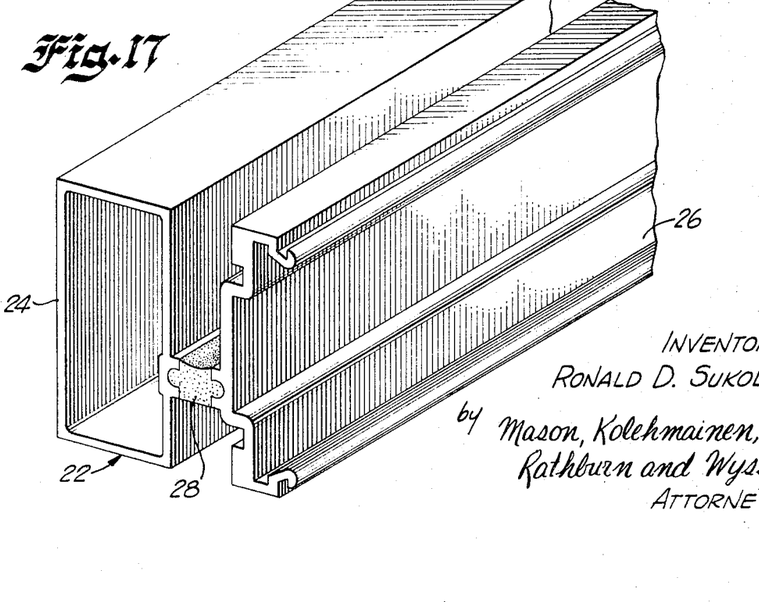
FIG. 17 is a perspective view of a segment of heat insulating structural member constructed in accordance with the present invention.

From the foregoing it will be seen that the successive vertical and horizontal alignment stations provide for close alignment of the spaced apart structural sections 24 and 26 during the process, and means are provided for accommodating a variety of different cross-sectional shapes and dimensions in the structural sections utilized. After passage of the separate structural sections 24 and 26 through the horizontal alignment station 210–1 and the close vertical alignment station 212–1, the dimension between the spacing pocket or channel forming surfaces of the structural sections has been closely established and maintained, and plastic heat insulating material in a flowable semiplastic stream or state, at about 350° F., is introduced as a flowing stream (FIG. 15) into the channel space between the structural sections. As best shown in FIG. 15, the semiplastic material, such as sold under the trade name "Surlyn," previously mentioned, is flowable into the channel station defined between the aligned structural sections 24 and 26 to integrally join these channels which have been preheated to approximately 350° F. in the oven structure previously described. Excellent bonding between the heat insulating material and the structural sections is achieved and the flow rate of the material in the stream is adjusted so that the desired cross-sectional area of the insulating material 28 is provided.

Briefly, the pouring station 326 includes a hopper 328 for holding a supply of plastic material in a pelletized state and a conical feed chute 330 leading downwardly thereof into a final electrically powered and heated flow control valve 332. The valve 332 is provided with a thermostatically controlled electric heater for elevating and maintaining the temperature of the plastic material flowing through the valve at a desired level. In addition, the heated flow control valve is movable between an open and a fully closed position through a number of variable flow rate open positions to achieve the desired rate of material deposition in the space between the structural section being utilized. In order to assure that material is not being discharged through the flow control valve 332 when the structural sections 24 and 26 are not present, an electric eye system including electric eye members 334 (FIGS. 1A and 10) are utilized to send appropriate control signals to a solenoid winding 336 of the control valve 332 for closing the same when electric eyes 334 do not sense the presence of structural members in position for filling with the flowable heat insulating plastic material.

In order to support the heat insulating material 28 in the channel defined between the moving structural sections 24 and 26 while the heat insulating material is still in a semiplastic or uncured state, the apparatus 20 includes an endless backing member 338 formed of stainless or other materials and treated with appropriate surface materials to prevent adherence of the heat insulating plastic material 28 thereto. The endless backing belt is trained over a drive sheath 340 carried on a shaft 342 and an idler sheath 344 carried on an ilder shaft 346 at the exit end of the forward run of the backing belt. The drive shaft 342 is supported on bearings 348 (FIG. 10) carried on upstanding support brackets 350 and a shaft 342 is driven through a sprocket 352 by the chain 72, as best shown in FIGS. 1A and 10. The idler shaft 346 is adjustable toward and away from the drive shaft 342 by means of a support bracket assembly 354 and adjusting screws 356 and locknut 358. The screw 356 is threaded into a lock 360 and the screw bears against the end of a base block 362 on which upstanding support posts 364 of the bracket assembly 354 are mounted. The tension of the backing belt 338 is adjusted to prevent sagging and to prevent adequate support of the insulating material as it is cured by the process. By the time the material 28 leaves the backing belt 338, it has solidified or cured sufficiently to positively secure the structural sections 24 and 26 together into the integral structure member 22, in accordance with the present invention.

The backing belt 338 is cooled by spraying water thereon, or other means, from the lower end of the belt in order to further aid in the prevention of material stickage to the belt in the semiplastic stage adjacent the pouring station 326. In addition, any possibility of excess material remaining on the belt after it passes the lower run thereof is eliminated by means of wiping pads 366, supported on a bracket member 368, which is mounted at the entrance end of a U-shaped wall enclosure system 370 having vertical sidewalls and an end wall 372.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A method of continuously making elongated structural sections secured together by a continuous web of heat insulating material comprising the steps of aligning said structural sections in horizontal spaced apart relation forming an elongated continuous moving void therebetween, continuously closing the bottom of said moving void with a removable backing member, continuously moving said aligned structural sections and said backing member longitudinally together along parallel horizontal paths, filling said moving void with softened heat insulating material to bond to said structural sections, and hardening said heat insulating material before removal of said backing member.

2. The method of claim 1 wherein said softened heat insulating material is gravity flowed into said void between said moving sections.

3. The method of claim 2 wherein said backing member is moved continuously into contact with said sections to continuously close the bottom of said void in advance of the point of filling with said softened material and is moved along with said moving sections until reaching a selected point whereat said material is hardened and said backing member is continuously disengaged from said sections.

4. The method of claim 1 including the step of heating said structural sections to a desired elevated temperature prior to filling of said void with said softened heat insulating material to better bond said material to said sections.

5. The method of claim 4 including the step of cooling said backing member prior to closing said bottom of said void therewith to prevent bonding of said material to said backing member.

6. The method of claim 1 wherein said last mentioned step includes cooling said heat insulating material to harden the same.

7. The method of claim 6 wherein said cooling comprises cooling said backing prior to closing the bottom of said void therewith.

8. The method of claim 1 including the step of rigidly maintaining a precise spaced apart relation between said aligned structural sections between the time of filling said void with softened heat insulating material until hardening the same.

9. A method of claim 1 wherein said softened heat insulating material is extruded in a semiplastic continuous stream into said void as said aligned spaced apart structural sections are moved relative thereto in a horizontal direction.

References Cited
UNITED STATES PATENTS

| | | | |
|---|---|---|---|
| 3,410,931 | 11/1968 | Johnson | 156—79 X |
| 3,496,058 | 2/1970 | Schroter et al. | 156—79 X |
| 2,638,632 | 5/1953 | Glazer | 264—327 X |
| 3,530,029 | 9/1970 | Lemelson | 156—79 X |
| 3,240,853 | 3/1966 | Shichman | 264—327 X |
| 3,272,900 | 9/1966 | Ryan et al. | 156—242 X |
| 3,418,188 | 12/1968 | Hogg et al. | 156—246 |
| 3,490,978 | 1/1970 | Shockey et al. | 156—244 |
| 3,551,544 | 12/1970 | Hlinka | 264—327 X |

ALFRED L. LEAVITT, Primary Examiner

T. E. BOKAN, Assistant Examiner

U.S. Cl. X.R.

156—79, 246, 322; 264—261, 264, 265, 327